Aug. 12, 1947.   W. O. O'NEAL   2,425,438
MACHINE STOP
Filed June 15, 1944   2 Sheets-Sheet 1

INVENTOR
WILBERT O. O'NEAL
BY
ATTORNEYS

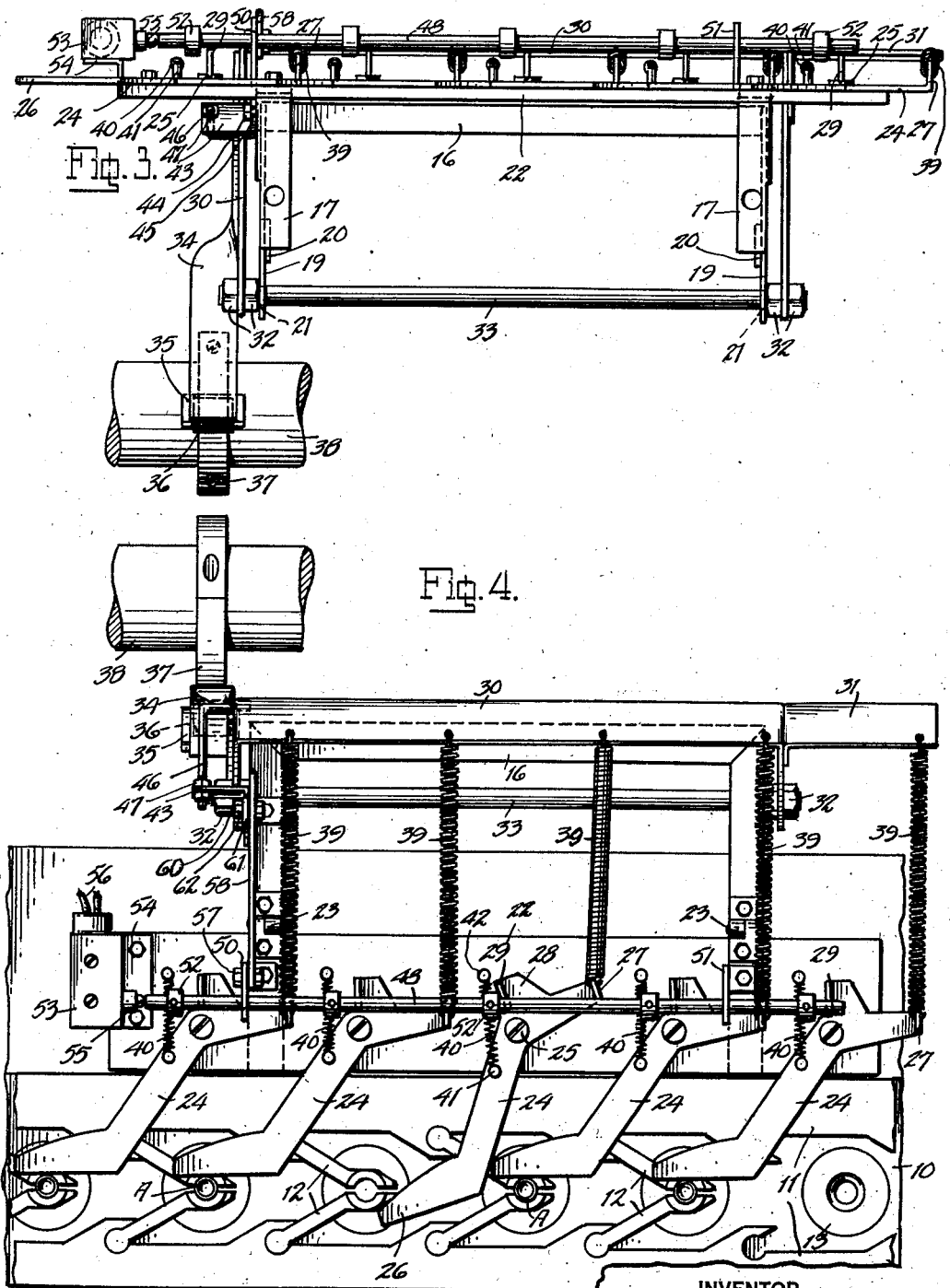

Patented Aug. 12, 1947

2,425,438

UNITED STATES PATENT OFFICE 2,425,438

MACHINE STOP

Wilbert O. O'Neal, Lees Summit, Mo., assignor to Remington Arms Company, Inc., Bridgeport, Conn., a corporation of Delaware Application June 15, 1944, Serial No. 540,411

11 Claims. (Cl. 192—125)

The present invention relates to a machine stop, and particularly a mechanism for stopping the operation of the machine automatically, in the event that any of the articles being processed in the machine are not in their proper feeding positions in the several operative stations of the machine. The invention is especially adapted for use in connection with a multiple press type machine, including a series of punches and dies and automatic feed means for moving the articles progressively from one station to the next. The particular machine illustrated by way of example is a bullet assembly machine, wherein the bullet components are operated upon by a series of punches and dies, the transfer mechanism for moving the bullets from one station to the next consisting of a reciprocating transfer unit from which the components are directed into the dies and to which they are returned as they are removed from the dies, suitable stripper means causing them to remain in the transfer unit, which thereupon reciprocates to transfer the articles to the next station. It frequently happens that through failure of the stripper means to operate properly, or for other reasons, the components are either absent from or in improper position in the transfer unit, and if the machine is allowed to remain in this condition serious damage is apt to result to the punch and die parts.

It is an object of the present invention to provide detector means adapted to operate during each cycle of the operation of the machine to detect whether or not all of the components at the several stations are in proper position in the transfer unit, and to stop the machine automatically in the event that any of the components are in improper position or are absent from the transfer unit.

A further object is to provide mechanism of this character which may be readily incorporated in present machines without appreciable alteration therein.

Another object is to provide a mechanism which may be readily adjusted to a position out of relation with the transfer unit for the purpose, for instance, of removing the transfer unit to obtain access to the dies.

With the above and other objects in view, an embodiment of the invention is shown in the accompanying drawings, and this embodiment will be hereinafter more fully described with reference thereto, and the invention will be finally pointed out in the claims.

In the drawings:

Fig. 3 is a front elevation of the stop mechanism, the transfer unit and its support, illustrated in Figs. 1 and 2, being removed for the sake of clearness.

Fig. 4 is a plan view showing the operative position of the stop mechanism in engagement with the components, a component being absent from one of the stations to illustrate the operation of the mechanism to stop the machine automatically.

Similar reference characters indicate corresponding parts throughout the several figures of the drawings.

Figure 1:
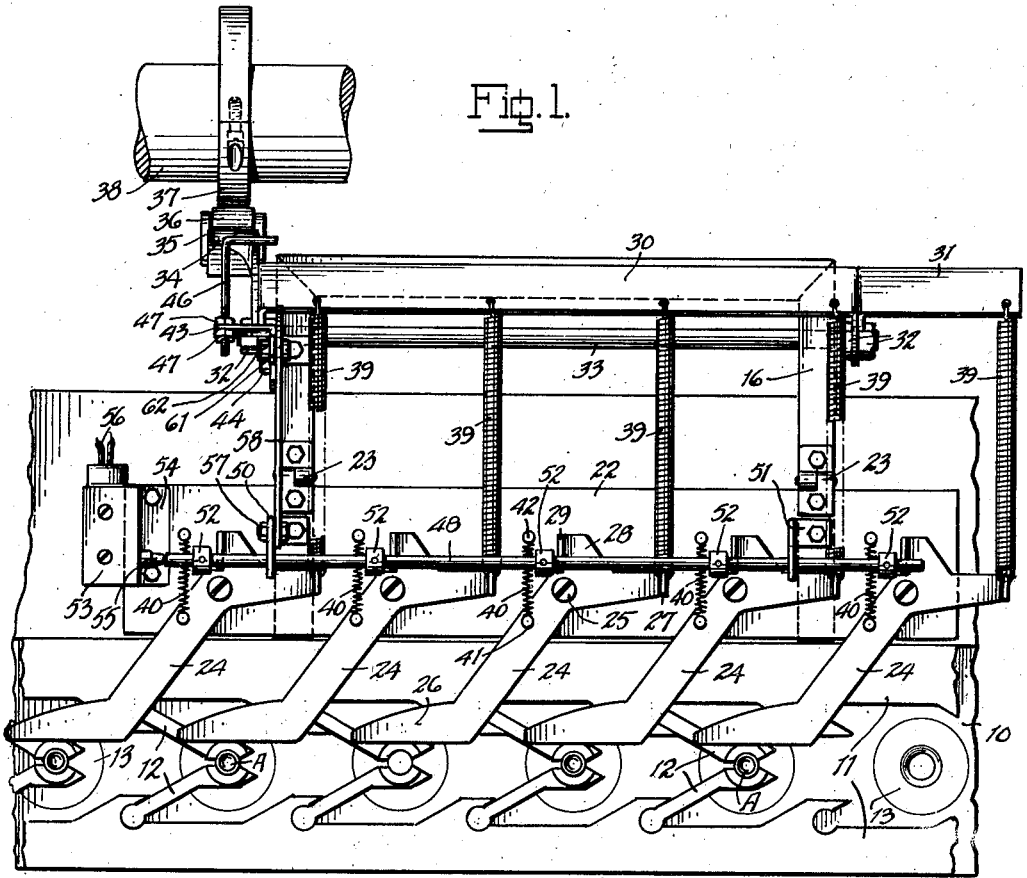
Fig. 1 is a plan view of the stop mechanism, according to the illustrated exemplary embodiment of the invention, the same being shown in its normal position out of engagement with the components in the transfer unit.

Referring to the drawings, the machine stop, according to the illustrated exemplary embodiment of the invention, is shown applied to a multiple press type machine including a transfer unit support 10 upon the longitudinally extending upper side of which there are mounted the reciprocating transfer bars 11 carrying a series of pairs of pivoted jaw members 12—12, normally spring pressed toward each other and adapted to yield outwardly, each pair of jaw members adapted to receive a component A as it is removed from the die 13 through the upward movement of the punch 14, which cooperates with a stripper 15 to remove the component from the punch so that it remains gripped between the jaws 12. Thereupon through reciprocation of the transfer bars the articles carried in the several pairs of jaws are transferred to the next operative stations where they are moved into the dies by the downstroke of the punches, the retraction of the transfer bars causing the jaws to be disengaged from the punches and to be re-engaged therewith at the retracted article receiving position of the transfer bars. It is pointed out that the forward feeding movement of the transfer bars takes place in the raised position of the punches, while the rearward retracting movement takes place while the punches are lowered into engagement with the dies.

Figure 2:
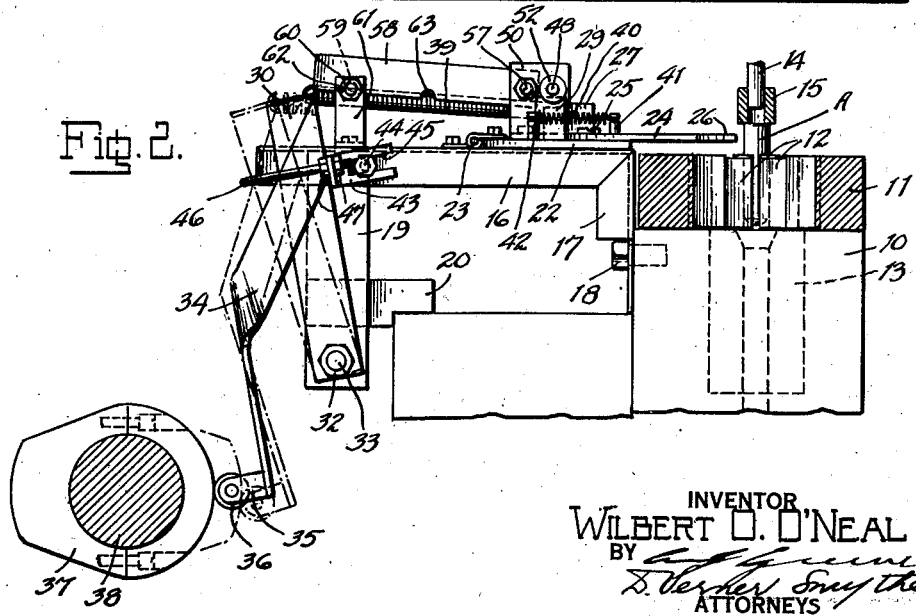
Fig. 2 is an end view thereof, the switch unit, illustrated in Fig. 1, being removed for the sake of clearness.

Following each stripping operation the components project above the jaws 12, as shown in Fig. 2, and in order for the machine to operate properly there should be a component in this raised position at each station. Otherwise, one or more of the components may have remained in the die or in a partially removed position, and in either case may cause serious damage if the machine is allowed to operate in this condition. The device of the invention is intended to detect the absence of a component from its proper position in the jaws 12, following the stripping of the components from the punches during the upstroke of the punches.

The stop mechanism comprises a mounting frame 16, of three sided rectangular form, consisting of a longitudinal angle iron back strip and transverse angle iron side strips welded to the back strip, the forward ends of the side strips having welded thereto vertical mounting strips 17 secured to the transfer bar support 10 by means of bolts 18. The side strips of the frame are provided in proximity to the back strip with downwardly projecting vertical leg members 19, preferably secured by welding, and to each of these leg members there is secured, also preferably by welding, a foot bracket member 20 resting upon the rearward end of the support 10. In their lower ends the legs 19 are provided with bearing apertures 21, for the pivotal mounting of one of the operative parts of the mechanism, as will presently more fully appear.

Upon the forward end portions of the side strips of the frame 16 there is mounted a longitudinal extending rectangular plate 22, hingedly connected at its rearward edge to the frame by the hinges 23—23. The illustrated mechanism is provided with detector means for five operative stations, and for this purpose there are provided upon the plate 22, at spaced points corresponding to the spacing of the operative stations, a series of detector levers 24 pivotally mounted upon pivot studs 25 screwed into the plate, these detector levers each projecting diagonally forwardly from the plate 22 into superimposed relation to the transfer unit and each being provided at its forward end with a longitudinally disposed component engaging finger portion 26 having a straight edge normally disposed longitudinally of the transfer bar and in opposed spaced relation to the upwardly projecting end of the component carried in the jaws 12. At its inner portion the detector lever extends longitudinally of the plate 22 and is provided at its end with an upright spring attaching ear 27, being further provided with a rearwardly projecting extension portion 28 having an upright contact ear 29 disposed substantially radially of the pivotal axis of the lever, and adapted upon swinging of the lever to contact the switch actuating means for the purpose of stopping the machine automatically, as will presently more fully appear.

At the back of the frame 16 there is provided a swinging yoke 30 comprising a longitudinally extending upper portion and downwardly extending side leg portions, an extension member 31 in continuation of the upper portion being secured to one of the side leg portions, preferably by welding. The lower ends of the side leg portions of the yoke are apertured and are secured by nuts 32 upon the threaded ends of a shaft 33 rotatably supported in the bearing apertures 21 of the leg portions 19 of the frame 16. To the other of the side legs of the yoke 30 there is secured, preferably by welding, a cam follower arm 34 extending downwardly in inclined relation to the yoke and bent intermediate its ends into obtuse angular form, so that the lower portion of the arm is in a plane at right angles to the plane of the upper portion and is substantially in spaced parallel relation to the leg of the yoke. This lower portion of the arm, which has slight yieldability, projects to a point substantially below the pivotal axis of the yoke and is provided at its lower end with a roller bracket 35 carrying a cam follower roller 36 which rides upon a cam 37 secured upon a drive shaft 38 of the press. This cam is adapted as the roller engages its rise to press the lower end of the arm 34 forwardly and thus swing the upper end of the yoke rearwardly, as shown by dot-and-dash lines in Fig. 2.

The upper longitudinal portion of the yoke is connected by a series of helical springs 39 to the spring attaching ears 27 of the respective detector levers 24, so that rearward swinging movement of the yoke imparts outward swinging movement to the detector levers. In opposition to the pulling force of the springs 39 each of the detector levers is connected by a helical spring 40 to the plate 22, these springs each extending between a post 41 secured to the forwardly projecting diagonal portion of its respective detector lever and a post 42 secured to the plate. The springs 40 are substantially lighter than the springs 39, so that there is a substantial differential in the pull between them, this differential being such that pull of the spring 39 in a substantially unstretched state will extend the spring 40 to cause the detector arm to be swung outwardly when the latter is unopposed by a component disposed in its swinging path. When opposed by a component the spring 39 will stretch as the yoke 30 is swung rearwardly.

The normal forwardly moved position of the yoke member, with the detector levers retracted, is determined by means of a stop bracket 43 of right angular form secured to the side of the frame 16 by a fastening screw 44 engaged with a slot 45 in the base of the bracket, this slot connection permitting the bracket to be adjusted forwardly or rearwardly, as well as angularly, so that its position may be accommodated to the inclined forward edge of the side leg of the yoke 30 which it abuts. The yoke is drawn forwardly against the stop bracket through the pull of the tensioned springs 40 exerted through the detector levers and the relatively heavier springs 39. In order to limit the rearward movement of the yoke member, and consequently the maximum projection of the detector levers, a right angularly bent stop finger 46 is secured in an aperture in the projected end of the stop bracket 43 by means of nuts 47 engaged upon the threaded end of the finger 46 at each side of the stop bracket, and which permits forward or rearward adjustment of the stop finger relatively to the stop bracket. The bent end of the stop finger extends across the path of movement of the side arm of the yoke to limit its rearward movement, as shown in dot-and-dash lines in Fig. 2, the yieldability of the lower end portion of the cam follower arm 34 permitting a degree of adjustment in the rearward movement of the yoke without changing the relation between the cam roller 36 and the cam 37.

Longitudinally of the plate 22 in superimposed relation to the contact ears 29 of the detector levers there is provided a longitudinally shiftable switch actuating rod 48 slidably mounted in a pair of apertured angle brackets 50 and 51 secured to the plate 22, preferably at points contiguous to the hinges 23—23. A series of collars 52 is secured upon the rod 48, one collar being provided in forwardly spaced opposed relation to the ear 29 of each of the detector levers. At one end of the plate 22 there is provided a switch unit 53, mounted upon a bracket 54 secured to the plate, and provided with a spring projected actuating plunger 55 opposed to the end of the rod 48, so that as pushing movement is imparted to the rod 48 the plunger 55 is depressed to actuate the switch, the spring projection of the plunger returning the rod to its normal position after such actuation. The switch illustrated is preferably a normally closed electric switch connected by conductor wires 56 to the operating motor of the machine, so that upon actuation of the switch the motor is stopped to cause stoppage of the machine. A suitable switch of this type is the well-known "Micro Switch," wherein adjustment is provided to enable the switch to be actuated at any predetermined degree of depression of the plunger 55, so that the switch actuation may be accurately co-related with the co-action of the detector levers and the rod 48.

To the bracket 50 there is secured by means of a pivot stud 57 a latch bar 58, provided in its under side near its rearward end with a notch 59 engaged upon a stud 60 provided in an angle bracket 61 secured upon the upper side of the side portion of the frame 16, the engagement of the bar with the stud 60 being secured by a clamping nut 62. In the normal operation of the stop mechanism, this latch bar 58 acts as a supporting strut between the frame 16 and the hinged plate 22, to prevent upward swinging movement of the plate through rearward pull of the springs 39 thereon as the yoke 30 is swung rearwardly, and for this purpose the normal disposition of the latch bar 58 is substantially parallel to the normal disposition of the springs 39, as shown clearly in Fig. 2. Upon disengagement of the latch bar from the stud 60, the plate 22 may be swung upwardly about the hinges 23 in order to move the detector levers out of vertical opposition to the transfer unit when it is desired to obtain access to the transfer unit and the dies for the purpose of removal or repair. The plate 22 may be secured in its raised position by engaging a second notch 63, provided in the lower edge of the latch bar, with the stud 60 and securing it by means of the clamping nut 62.

In operation, the components in the transfer unit normally have their upper ends projected above the jaws 12, as shown in Figs. 1 and 2, being placed in this position as they are stripped from the upwardly moving punches by means of the strippers 15. Following this engagement of the components in the transfer unit, and prior to the forward reciprocation of the transfer bars to move the components to the next operative stations, the stop mechanism is actuated through engagement of the rise of the cam 37 with the cam follower roller 36, the yoke member 30 being swung to its rearward position as shown in Fig. 4 and in dot-and-dash lines in Fig. 2. During the initial rearward movement of the yoke the pull of the relatively heavy springs 39 swings the several detector levers into contact with the components, the lighter springs 40 being extended during this initial movement. Thereupon, and during continued rearward movement of the yoke, swinging movement of the detector levers in contact with the components is arrested thereby, the springs 39 connected thereto being stretched. In the event that any of the components are missing from their proper positions in the jaws the detector lever for each station where a component is absent will not be arrested in its swinging movement, but will continue its outward swing through the pull of the spring 39 and the extension of the spring 40, as shown at one of the stations in Fig. 4. This swinging movement brings the contact ear 29 into pressing contact with the collar 52 of the rod 48, shifting the latter in the direction of the switch and pressing the switch plunger inwardly to the point where the switch is actuated to stop the machine. If all of the components are in their proper place in the transfer unit the detector levers simply swing into and out of contact therewith through the movement of the yoke, this short component engaging movement of the levers being insufficient to actuate the rod 48.

The form of the invention illustrated in the drawing and described herein is typical and illustrative only, and it is evident that the invention is capable of embodiments in other forms, all falling within the scope of the appended claims, which are to be broadly construed.

What is claimed is:

1. In a stop mechanism for detecting the absence of any one of a plurality of articles carried in predetermined spaced relation in article transfer means, a support adjacent the transfer means, a plurality of movably mounted detector members on the support in spaced relation matching that of the articles, each of said detector members being adapted to have projecting movement into contact with the article opposed thereto and to have a further projecting movement in the absence of such an article, intermittently operating actuating means, individual connections from said actuating means to each of the detector members to simultaneously impart projecting movement to all of the detector members, means to simultaneously retract all of the detector members, and stop means arranged to be actuated by said further movement of any one of the detector members.

2. In a stop mechanism for detecting the absence of any of a plurality of articles carried in article transfer means, a support, a plurality of pivotally mounted detector levers in spaced relation upon said support, said levers adapted to have swinging movement into contact with said articles and to have further swinging movement in the absence of said articles, a movable member having to and fro movement, a spring connecting each of said detector levers to said movable member whereby rearward movement of said movable member imparts outward swinging movement to said detector levers, a spring connected between each of said detector levers and said support at the opposite side of its pivot from the connection of said first mentioned spring and substantially lighter than said first mentioned spring whereby pull of said first mentioned spring is adapted to swing said detector lever in said swinging movements thereby extending said relatively lighter spring, and stop means arranged to be actuated by any one of said detector levers upon said further swinging movement thereof.

3. In a stop mechanism for detecting the absence of any of a plurality of articles carried in article transfer means, a support, a plurality of pivotally mounted detector levers in spaced relation upon said support, said levers adapted to have swinging movement into contact with said articles and to have further swinging movement in the absence of said articles, a movable member having to and fro movement, a spring connecting each of said detector levers to said movable member whereby rearward movement of said movable member imparts outward swinging movement to said detector levers, a spring connected between each of said detector levers and said support at the opposite side of its pivot from the connection of said first mentioned spring and substantially lighter than said first mentioned spring whereby pull of said first mentioned spring is adapted to swing said detector lever in said swinging movements thereby extending said relatively lighter spring, a longitudinally shiftable switch actuating rod carried by said support having a plurality of abutment means respectively in the swinging paths of said detector levers, abutment means upon said detector levers adapted through said further swinging movement of said levers to engage said abutment means of said rod to impart shifting movement to the latter, and a switch unit arranged to be actuated through shifting movement of said rod.

4. In a stop mechanism for detecting the absence of any of a plurality of articles carried in article transfer means, a support, a plurality of pivotally mounted detector levers in spaced relation upon said support, said levers adapted to have swinging movement into contact with said articles and to have further swinging movement in the absence of said articles, a swinging yoke member, a spring connecting each of said detector levers to said yoke member whereby rearward movement of said yoke member imparts outward swinging movement to said detector levers, a spring connected between each of said detector levers and said support at the opposite side of its pivot from the connection of said first mentioned spring and substantially lighter than said first mentioned spring whereby pull of said first mentioned spring is adapted to swing said detector lever in said swinging movements thereby extending said relatively lighter spring, actuating means for imparting intermittent rearward movement to said yoke member, and stop means arranged to be actuated by any one of said detector levers upon said further swinging movement thereof.

5. In a stop mechanism for detecting the absence of any of a plurality of articles carried in article transfer means, a support, a plurality of pivotally mounted detector levers in spaced relation upon said support, said levers adapted to have swinging movement into contact with said articles and to have further swinging movement in the absence of said articles, a swinging yoke member, a spring connecting each of said detector levers to said yoke member whereby rearward movement of said yoke member imparts outward swinging movement to said detector levers, a spring connected between each of said detector levers and said support at the opposite side of its pivot from the connection of said first mentioned spring and substantially lighter than said first mentioned spring whereby pull of said first mentioned spring is adapted to swing said detector lever in said swinging movements thereby extending said relatively lighter spring, actuating means for imparting intermittent rearward movement to said yoke member, a longitudinally shiftable switch actuating rod carried by said support having a plurality of abutment means respectively in the swinging paths of said detector levers, abutment means upon said detector levers adapted through said further swinging movement of said levers to engage said abutment means of said rod to impart shifting movement to the latter, and a switch unit arranged to be actuated through shifting movement of said rod.

6. In a stop mechanism for detecting the absence of any of a plurality of articles carried in article transfer means, a hinged support, a plurality of pivotally mounted detector members in spaced relation upon said support and projecting over said transfer means, said detector members adapted to have projecting movement into contact with said articles and to have further projecting movement in the absence of said articles, a movable member having to and fro movement, means connecting each of said detector members to said movable member to impart projecting and retracting movement to said detector members, and stop means arranged to be actuated by said detector members upon said further projecting movement thereof, said hinged support adapted to be swung upwardly to remove said detector members from their operative position above said transfer means.

7. In a stop mechanism for detecting the absence of any of a plurality of articles carried in article transfer means, a fixed support, a plate hinged to said fixed support, a plurality of pivotally mounted detector levers in spaced relation upon said plate, said levers adapted to have swinging movement into contact with said articles and to have further swinging movement in the absence of said articles, a swinging yoke member mounted on said fixed support, a spring connecting each of said detector levers to said yoke member whereby rearward movement of said yoke member imparts outward swinging movement to said detector levers, a spring connected between each of said detector levers and said plate at the opposite side of its pivot from the connection of said first mentioned spring and substantially lighter than said first mentioned spring whereby pull of said first mentioned spring is adapted to swing said detector lever in said swinging movements thereby extending said relatively lighter spring, stop means arranged to be actuated by any one of said detector levers through said further swinging movement thereof, and a latch bar connected between said hinged plate and said fixed support constituting a supporting strut against lifting movement of said plate under the pull of said first mentioned springs, said plate being adapted to be lifted upon disconnection of said latch bar.

8. In a stop mechanism for detecting the absence of a component at an operating station of an ammunition component assembly machine; a tool at said operating station; driving means for the machine; reciprocating transfer means having component positioning means thereon for transferring components to and from said station; a control switch for said driving means; a detector member for operating said control switch; means for holding said detector member from contacting said switch until said transfer means has returned from a reciprocatory transfer movement; and means driven by said machine in timed relation with said tool to urge said detector member toward switch operating position after said transfer means has returned from a reciprocatory transfer movement to stop the machine in the absence of a component for transfer away from said operating station by said reciprocating transfer means.

9. In a stop mechanism for detecting the absence of an article from an article transfer means, a support mounted adjacent to the transfer means, a detector member movably mounted upon the support, said detector member being adapted to have projecting movement into contact with an article carried by the transfer means and adapted to have a further projecting movement in the absence of such an article, spring means connected between the detector member and the support arranged to retract the detector member, intermittently actuated spring means of gerater relative strength than the first-mentioned spring means adapted to cause projecting movement of the detector member, and stop means actuated by said further projecting movement.

10. In a stop mechanism for detecting the absence of an article from an article transfer means, a support mounted adjacent to the transfer means, a detector member movably mounted upon the support, said detector member being adapted to have projecting movement into contact with an article carried by the transfer means and adapted to have a further projecting movement in the absence of such an article, a swinging yoke member, a spring connecting the detector member to the yoke member whereby rearward movement of the yoke member imparts outward swinging movement to the detector member, a spring connected between the detector member and the support in opposition to the first-mentioned spring and substantially lighter than the first-mentioned spring whereby actuation of the first-mentioned spring is adapted to cause projecting movement of the detector member and extend said relatively lighter spring, actuating means for imparting intermittently swinging movement to the yoke member, a longitudinally shiftable switch actuating rod carried by the support having an abutment in the path of the detector member, abutment means upon the detector member adapted to engage the abutment on the switch actuating rod during said further movement of the detector member to impart shifting movement to the actuating rod, and a switch unit arranged to be actuated through shifting movement of said rod.

11. In a stop mechanism for detecting the absence of any one of a plurality of articles carried in article transfer means, a fixed support, a plate hinged to the fixed support, a detector assembly mounted on the plate in position to detect the absence of any one of said articles, and a latch bar connected between the hinged plate and the fixed support bracing the plate in operating position, the plate being adapted to be lifted on disconnection of the latch bar and moved to a position in which access to the transfer means is not obstructed.

WILBERT O. O'NEAL.

REFERENCES CITED

The following references are of record in the file of this patent:

UNITED STATES PATENTS

| Number | Name | Date |
| --- | --- | --- |
| 2,373,582 | Kuehl | Apr. 10, 1945 |
| 1,313,766 | Ulam | Aug. 19, 1919 |
| 2,299,106 | Pechy | Oct. 20, 1942 |
| 2,369,298 | Jongedyk | Feb. 13, 1945 |
| 2,317,839 | Westin | Apr. 27, 1943 |
| 2,286,130 | Vergobbin | June 9, 1942 |
| 2,271,717 | Schwartz | Feb. 3, 1942 |
| 2,269,473 | Nordquist | Jan. 13, 1942 |
| 2,238,980 | Metcalf et al. | Apr. 22, 1941 |